United States Patent
Garcia-Ferre et al.

(10) Patent No.: US 12,470,009 B2
(45) Date of Patent: Nov. 11, 2025

(54) CONTACT ELEMENT FOR AN EV CONNECTOR WITH CAPILLARY FLUID COOLING

(71) Applicant: ABB E-MOBILITY B.V., Delft (NL)

(72) Inventors: Francisco Garcia-Ferre, Baden (CH);
Lilian Kaufmann, Birmenstorf (CH);
Pedram Kheiri, Hausen (CH); Stefan Raaijmakers, Delft (NL); Wiebe Zoon, Delft (NL)

(73) Assignee: ABB E-Mobility B.V., Delft (NL)

( * ) Notice: Subject to any disclaimer, the term of this patent is extended or adjusted under 35 U.S.C. 154(b) by 387 days.

(21) Appl. No.: 17/948,606

(22) Filed: Sep. 20, 2022

(65) Prior Publication Data

US 2023/0085839 A1    Mar. 23, 2023

(30) Foreign Application Priority Data

Sep. 21, 2021 (EP) .................................. 21197987

(51) Int. Cl.
| | |
|---|---|
| *H01R 13/46* | (2006.01) |
| *B60L 53/16* | (2019.01) |
| *F25B 41/40* | (2021.01) |
| *H01R 13/02* | (2006.01) |
| *H01R 13/502* | (2006.01) |

(52) U.S. Cl.
CPC .............. *H01R 13/46* (2013.01); *B60L 53/16* (2019.02); *F25B 41/40* (2021.01); *H01R 13/02* (2013.01); *H01R 13/502* (2013.01); *H01R 2201/26* (2013.01)

(58) Field of Classification Search
CPC ...... H01R 13/46; H01R 13/02; H01R 13/502; H01R 2201/26; B60L 53/16; B60L 53/18; F25B 41/40; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 10,029,575 B2* | 7/2018 | Remisch | .............. H01R 13/005 |
| 10,081,262 B2* | 9/2018 | Nagel | .................... B60L 53/31 |
| 10,109,395 B2 | 10/2018 | Beimdieck et al. | |
| 2018/0075946 A1* | 3/2018 | Beimdieck | .......... H01R 13/005 |
| 2018/0264957 A1 | 9/2018 | Fuehrer et al. | |

(Continued)

FOREIGN PATENT DOCUMENTS

| | | |
|---|---|---|
| DE | 102011100389 A1 | 5/2012 |
| DE | 102016206300 A1 | 10/2017 |

(Continued)

OTHER PUBLICATIONS

European Patent Office, Extended European Search Report in European Patent Application No. 21197987.7, 10 pp. (Feb. 17, 2022).

*Primary Examiner* — Abdullah A Riyami
*Assistant Examiner* — Nader J Alhawamdeh
(74) *Attorney, Agent, or Firm* — McCarter & English, LLP

(57) ABSTRACT

A contact element for an electric vehicle (EV) connector that is configured to connect a charging wire to a connector interface on a vehicle side includes a front part and at least one base. The front part comprises walls having an inner and an outer side that enclose a hollow chamber, which is partly filled with a fluid, and the inner side of the walls are designed having a capillary structure.

14 Claims, 4 Drawing Sheets

(56) References Cited

U.S. PATENT DOCUMENTS

| | | | |
|---|---|---|---|
| 2019/0074628 A1* | 3/2019 | Fuehrer | H01R 13/5221 |
| 2019/0315239 A1* | 10/2019 | Beimdieck | B60L 53/16 |
| 2019/0326762 A1* | 10/2019 | Zoon | B60L 53/302 |
| 2023/0085839 A1* | 3/2023 | Garcia-Ferre | F25B 41/40 |
| | | | 439/485 |
| 2023/0092835 A1* | 3/2023 | Garcia-Ferre | B60L 53/18 |
| | | | 439/487 |

FOREIGN PATENT DOCUMENTS

| | | | | |
|---|---|---|---|---|
| DE | 102016117011 A1 | | 3/2018 | |
| DE | 102019113591 A1 | | 11/2019 | |
| EP | 3770005 A1 | * | 1/2021 | ............. B60L 53/16 |
| EP | 3770007 A1 | | 1/2021 | |
| JP | 2012-238532 A | | 12/2012 | |
| WO | WO 2017/133893 A1 | | 8/2017 | |
| WO | WO 2017/143295 A1 | | 8/2017 | |
| WO | WO 2017/162464 A1 | | 9/2017 | |
| WO | WO 2017/162494 A1 | | 9/2017 | |
| WO | WO 2017/162532 A1 | | 9/2017 | |
| WO | WO 2017/162651 A1 | | 9/2017 | |
| WO | WO 2018/006903 A1 | | 1/2018 | |
| WO | WO 2018/050724 A1 | | 3/2018 | |
| WO | WO 2018/060151 A1 | | 4/2018 | |
| WO | WO 2018/192805 A1 | | 10/2018 | |
| WO | WO 2019/008047 A1 | | 1/2019 | |
| WO | WO 2021/048380 A1 | | 3/2021 | |

* cited by examiner

US 12,470,009 B2

CONTACT ELEMENT FOR AN EV CONNECTOR WITH CAPILLARY FLUID COOLING

CROSS-REFERENCE TO RELATED APPLICATIONS

This patent application claims priority to European Patent Application No. 21197987.7, filed on Sep. 21, 2021, which is incorporated herein in its entirety by reference.

FIELD OF THE DISCLOSURE

The present disclosure relates to a contact element for an EV (Electric Vehicle) connector, an EV connector comprising a contact element, and a use of a contact in an EV connector.

BACKGROUND OF THE INVENTION

Today, forced liquid cooling is used to cool both the cable and the contacts of an EV charging connector, where fresh coolant comes to a chamber at the base of the DC (Direct Current) contacts, and it then flows back through the power cables.

BRIEF SUMMARY OF THE INVENTION

There may be a desire to provide a system with an improved cooling. The described embodiments of the present disclosure pertain to the contact element for an EV connector, the EV connector comprising a contact element, and the use of a contact in an EV connector. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense or meaning. If a specific meaning is conveyed to certain terms, definitions of terms will be given in the following in the context of which the terms are used.

According to a first aspect, a contact element for an EV connector configured for connecting a charging wire to a connector interface on vehicle side is provided. The contact element has a front part and at least one base. The front part comprises walls that enclose a hollow chamber, which is partly filled with a fluid, and the walls are designed having a capillary structure.

The EV connector may be, for example a Medium Voltage (MV) connector. On one side, the connector receives a cable from a charging station. The other side that includes the connector is designed to be connected to the vehicle, which is equipped with a counterpart of the connector. The counterpart is also referred to as "car inlet". The actual galvanic connection between the connector and car inlet is provided by the contact, sometimes also described by the term "contact element". Usually, the connector comprises two or more contacts or contact elements, for example, one for DC+ and one for DC− in case of DC charging, and additionally grounding and control/pilot pins. Although only one contact is described, the embodiments apply to all contacts in the connector.

Due to the unavoidable contact resistance at the transition from the contact on connector side to the counter-contact on vehicle side, the connector heats up. The heat has to be dissipated or lead away. This is achieved by the heat conducting material of the contact itself, for example copper and by the heat conducting arrangement, where the contact is hollow and an evaporating fluid transports the heat to colder areas of the contact. The backflow of the fluid is provided by the walls of the contact themselves, more exactly by the capillary structure.

The capillary structure exists only at the inner side of the walls. Preferably, all of the walls, i.e. all inner sides of the contact are designed with the structure. That is, the chamber does not comprise a structure attached to the wall or inserted into the chamber, but the walls themselves are manufactured in the inside of the contact such they form the structure. The capillary structure receives the fluid that condenses at a cooler area of the connector and conducts the fluid to the hotter part of the connector where it evaporates.

The front part is the part that has actually contact to the counter-connector on vehicle-side when the connector is connected to the vehicle.

BRIEF DESCRIPTION OF THE SEVERAL VIEWS OF THE DRAWING(S)

Figure 3:
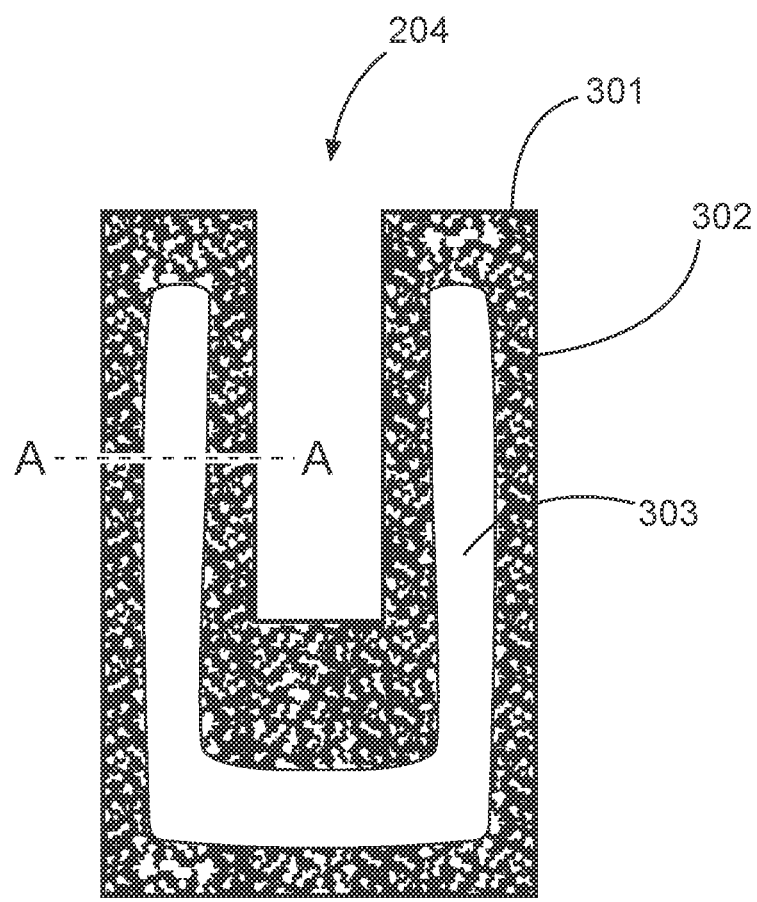
FIG. 3 is a diagram of a cut through the front part of a U-shaped contact element in accordance with the disclosure.
Figure 4:
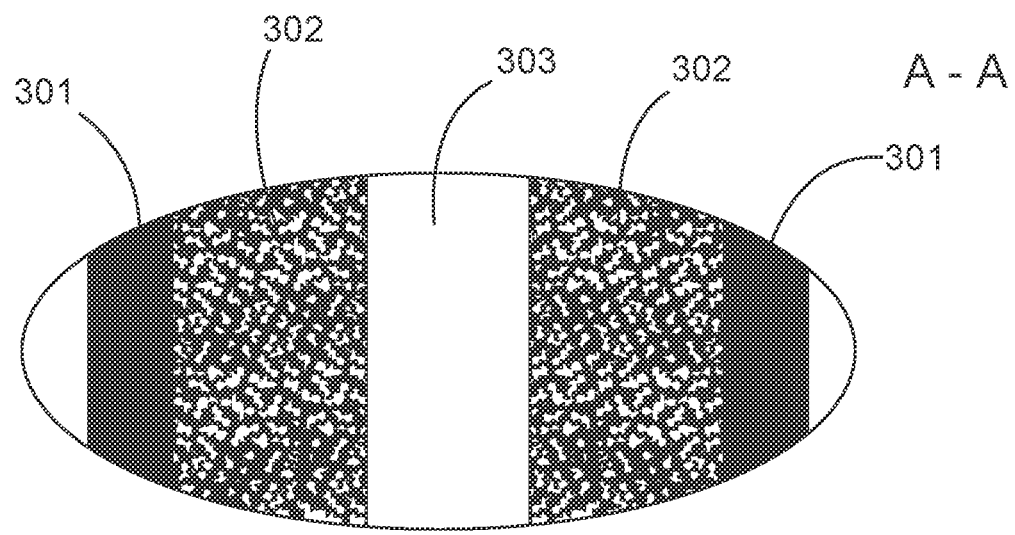

FIG. 4 a cut A-A through the contact element shown in FIG. 3.

Figure 5A:
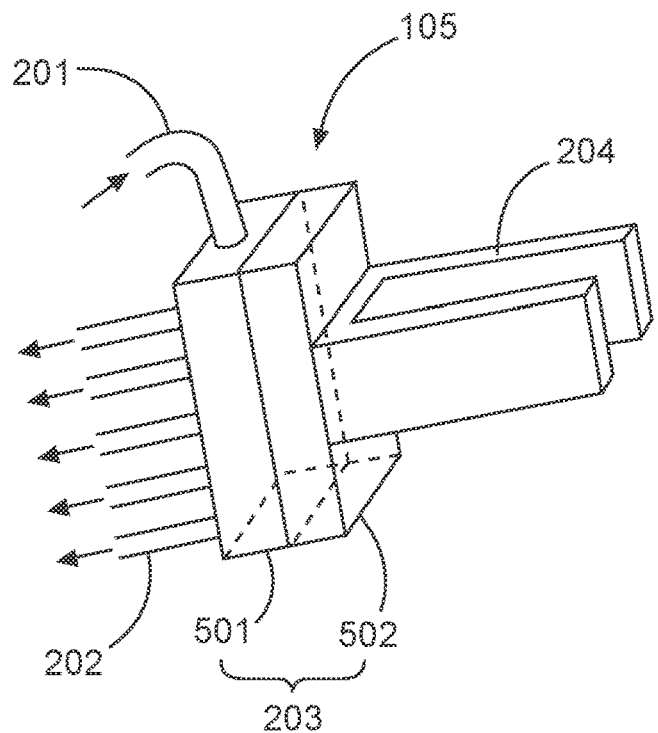

FIG. 5a is a 3D-diagram of first example of a contact element with the U-shaped front part of the contact element in accordance with the disclosure.

Figure 5B:
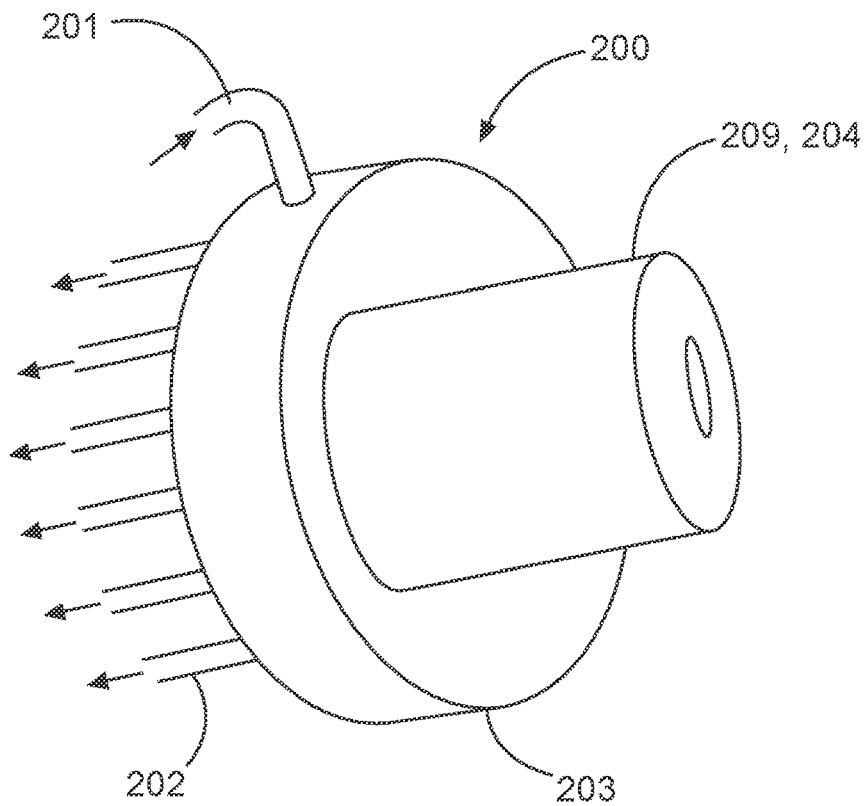

FIG. 5b is a 3D-diagram of second example of a contact element with the U-shaped front part of the contact element in accordance with the disclosure.

Figure 6:
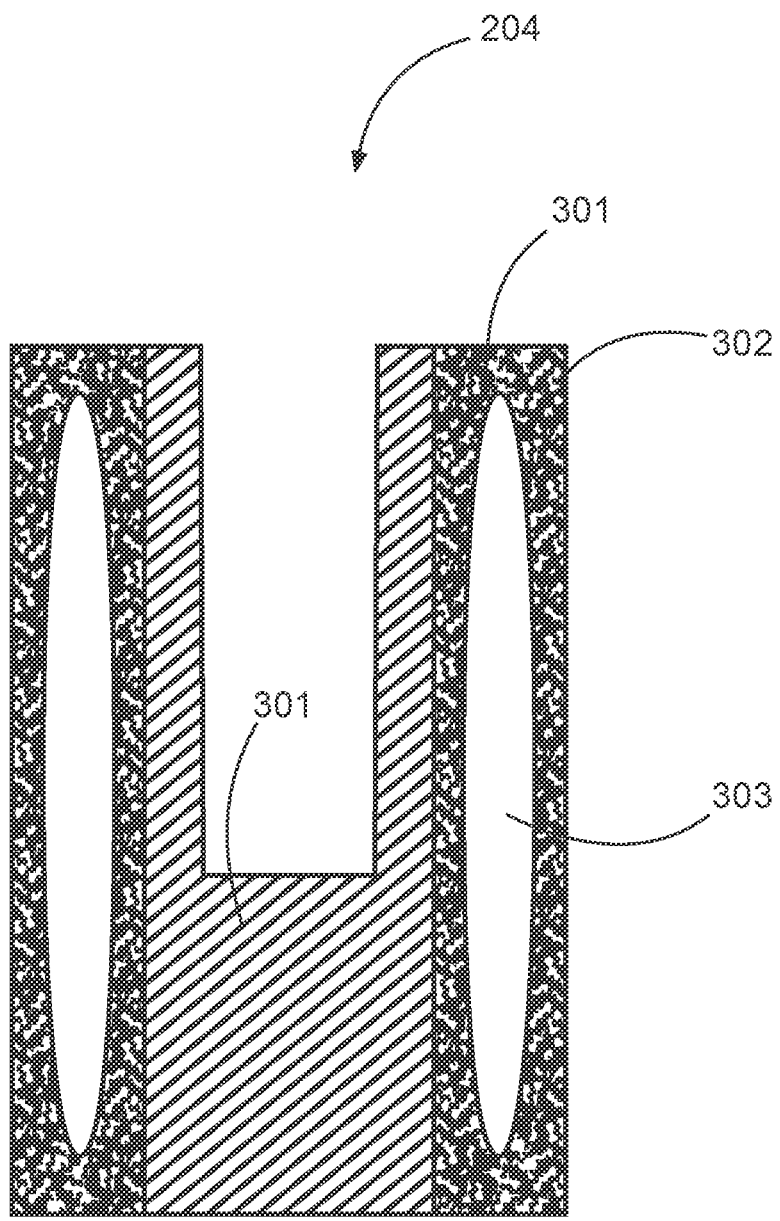

FIG. 6 shows a diagram of a further embodiment of the front part in accordance with the disclosure.

DETAILED DESCRIPTION OF THE INVENTION

Corresponding parts are provided with the same reference symbols in all figures.

Figure 1:
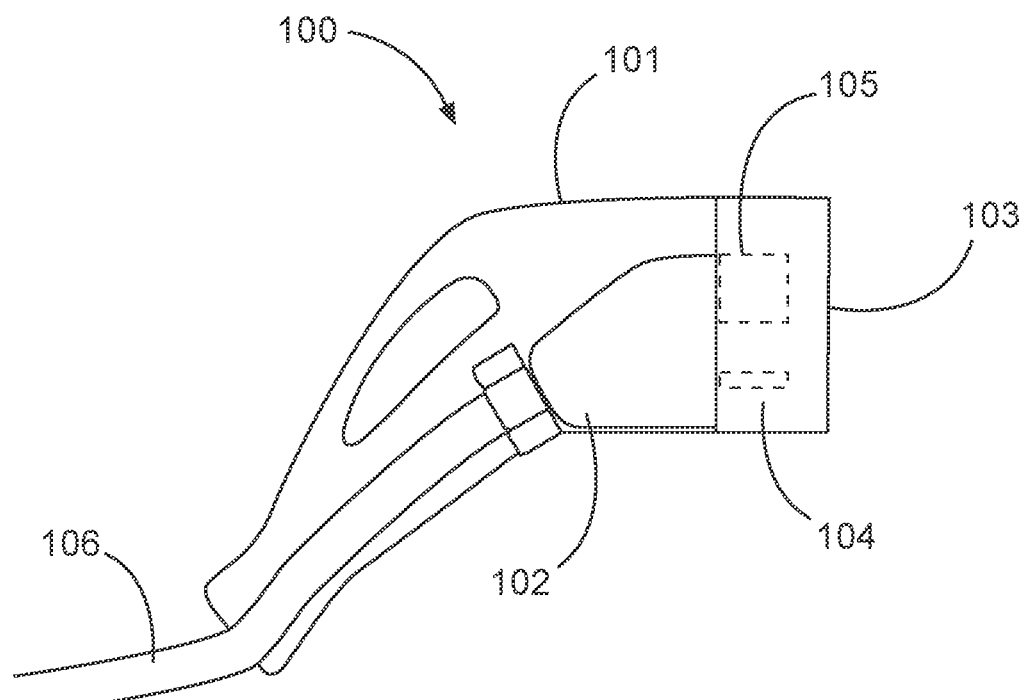
FIG. 1 is a diagram of a charging connector in accordance with the disclosure.

FIG. 1 shows a diagram of a charging connector 100. The connector 100 comprises an external housing 101 and an inner housing 102. The connector 100 receives a cable 106 on one side that runs through the connector 100 to the inner housing 102 to a mating interface 103. The cable 106 ends in the inner housing at contact elements 105 and further contacts 104. The contact element 105 and further contacts 104 extrude from the inner housing to the mating interface. When connected to a vehicle inlet, contact element 105 transfers the charging current from the charging wires in cable 106 to the contact element of the vehicle inlet. Besides wires for DC+, DC−, Neutral Line and signaling lines, the cable comprises tubes filled with coolant for cooling the wires and the contact elements 105.

Figure 2:
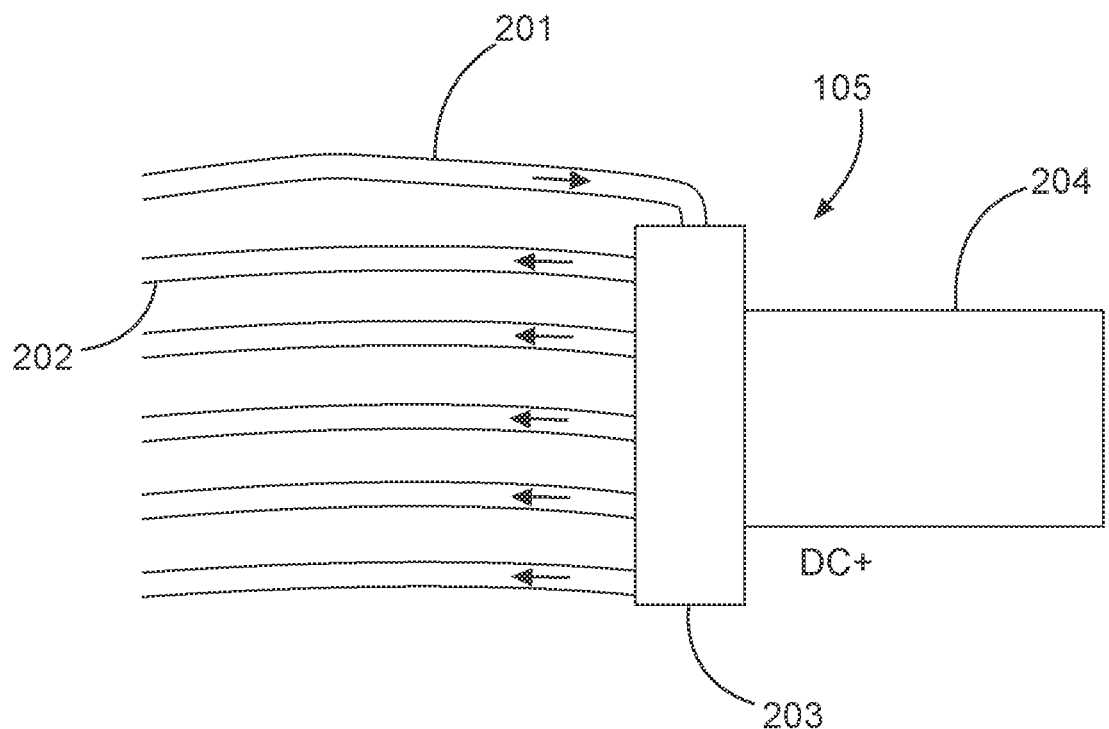
FIG. 2 is a diagram of cooling mechanism for cooling the wires, and especially the contact elements, in accordance with the disclosure.

FIG. 2 shows a diagram of cooling mechanism for cooling the wires and especially the contact elements 105 using tubes 201, 202 filled with a coolant. Tubes 201 carry the coolant originating from a charging station in a direction towards the contact elements 105. Contact elements 105 are composed of two parts 203, 204. One part 204 has direct contact to its counter-part on vehicle side. Thus, this part may be also be designated as hot part 204 or front part 204. The other part may be designated as "base" 203, on which the front part 204 is arranged on or as cool part 203, since the coolant flows through this part 203. Although shown as two parts 203, 204, the contact element may be one integral device. The base 203 has several outlets through which the coolant exits into the tubes 202 that carry the coolant back to the charging station.

FIG. 3 shows a diagram of a cut through the front part 204 of a U-shaped contact element 105. The front part 204 comprises a hollow chamber or cavity 303 that is filled partly with a fluid. Hollow chamber 303 is formed by the walls 301 of contact element 105. The inner side of the walls 301, "inner walls" for short, has a capillary or porous structure 302. FIG. 4 shows a cut A-A through the contact element as indicated in FIG. 3. The reference numerals correspond to those of FIG. 3.

FIG. 5a shows a 3D-diagram of first example of a contact element 105 with a U-shaped front part of the contact element 105. The middle part and the part near the opening of the "U", i.e., the right part in FIG. 5 will get hottest during charging. The fluid inside the front part in these areas evaporates. The vapor condenses at the bottom part of the "U", i.e., the left side of the front part in FIG. 5a such that the pressure will get lower in this area and the vapor flows into this direction. The condensed water is guided back by the capillary structure to the arms and the open part of the "U". The cooling is supported by the cooling mechanism where a coolant from, e.g., a charging station flows over tube 201 through the base 501 and through tubes 202 back again to the charging station. The number of tubes 202 may be any number, e.g., 3, 4 or 5. Between the front part 204 and base 501 through which the coolant flows, a further base 502 may be arranged optionally, such that the front part is arranged on base 502. Bases 501 and 502 may have the same width and length such that the heat is transferred through the complete surfaces of the common sides. Bases 501 and 502 form the base 203. The shapes in FIG. 5a are drawn angular, however, the corners may be rounded, the bases may have a cylindrical shape, and also the distance of the arms of the U may vary.

FIG. 5b shows a 3D-diagram of first example of a contact element 105 with a round front part 204 of the contact element 105 and a round base 501. A pin 209 is shown forming the front part 204. The pin may be hollow and the inner walls comprise a capillary structure as described herein.

FIG. 6 shows a diagram of a further embodiment of the front part 204, where the middle portion is solid, as well as the inner portions of the arms of the "U". Pieces containing the capillary structures and the cavities are arranged at the outer sides of the arms of the "U". This allows a separate manufacturing of the pieces with the capillary structured which may attached to the arms of the "U" in a subsequent step.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

REFERENCE NUMERALS 100 charging connector
101 external housing
102 inner housing
103 mating interface
104 contact
105 contact element
106 charging cable
201 tube for inputting coolant
202 tube for outputting coolant
203 base part
204 front part/contact portion
209 pin/elongated body
301 wall(s) of front part
302 porous structure
303 cavity
501 base (cable side, carrying front part)
502 base (front part side; between base 501 and pins)

In general, the DC+/− contacts may have a round or a flat shape. The shape of the grounding and control/pins may differ from the DC+/− pins. These pins may be round, and because no charging current flows over these contacts, they may be solid without having a structure as proposed for the DC+/− pins.

According to an embodiment, the front part of the contact element has a cross-section with a U-shape, wherein the hollow chamber extends along the complete U-shape.

The U-shape may be angular, and the "U" may be described as having two projecting arms and a bottom or backside. In this embodiment, the hollow chamber extends from the first arm through the backside to the second arm without separation, and the structured walls enclose the single hollow chamber.

According to an embodiment, the front part of the contact element has a cross-section with a U-shape, wherein the hollow chamber extends along one arm of U-shape and a further hollow chamber extends along a further arm of U-shape.

Again, the U-shape may be angular, and the "U" may be described as having two projecting arms and a bottom or backside. In this embodiment, there are two hollow chambers separated by a solid block in-between the arms of the "U".

According to an embodiment, the front part (204) of the contact element (105) has a cross-section with a U-shape, wherein the U-shape has a rotational symmetry along its central axis, wherein the hollow chamber (303) extends along the arm defined by the rotational symmetry of the U-shape.

In this case, the pin has a circular footprint and the "U" forms an annular cylinder. That is, it is not massive but has a free or open space at its center. The annular cylinder is hollow. Its walls define the hollow chamber, which acts as heat pipe. The inner surface of the walls, that is, the walls of the hollow chamber have a capillary structure.

According to an embodiment, the front part of the contact element has a first base, wherein the first base is solid, and wherein the first base is arranged on a second base, wherein the second base is fluid-cooled.

The arrangement of the connector may hence be divided into three parts: the U-shaped front part, a first base and a second base. The first and the second base may have same or similar width and length such that they fit together with maximum heat transfer between each other. The first base may be mounted on the second base, or they may be integral. Similarly, the front part may be mounted on the first base or they may form an integral part. The second base may be connected to the wire or line, respectively, carrying the charging current. Furthermore, according to this embodiment, the second base may be flowed through by a coolant. That is, the second base has a hollow chamber or fluid lines, and an inlet and at least one outlet for the fluid flowing through the chamber or fluid lines of the second base. By this arrangement, the heat generated at the very front of the U-shaped front part is conducted through by the evaporated fluid to the first base, from the first base to the second base, and there, it is transported away by the cooling fluid flowing through the second base. As an effect, the bases are cooled, and the evaporating and condensing mechanism of the front part works effectively. Therefore, the overall concept of the cooling is an interlocking of two cooling mechanisms, interconnected by the bases.

According to an embodiment, the front part of the contact element is a clip spring.

With the clip spring, the contact element acts as a female connecting element that receives a tongue of the car inlet when connecting.

According to an embodiment, the capillary structure is a printed structure.

One possible way to manufacture the walls including the structure, and maybe also at least the first base as a single piece is through 3D printing, e.g., using powder bed fusion, that is, by tuning the power of the laser spot to obtain fully dense or porous structures.

According to a further aspect, an EV connector comprising a contact element as described herein is provided.

The charging connector may be, for example, a charging connector for medium voltage (MV) charging.

According to a further aspect, a use of a contact element as described herein in an EV connector is provided.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A contact element for an electric vehicle (EV) connector for connecting a charging wire to a connector interface on a vehicle side, comprising:
    a front part defined on the contact element; and
    at least one base defined on the contact element,
    wherein the front part comprises walls having an inner side and an outer side that enclose a hollow chamber, the hollow chamber being configured to be partly fillable with a fluid during operation,
    wherein the inner side of the walls is configured to draw the fluid from the hollow chamber via capillary structures formed within the walls,
    wherein the front part of the contact element has a first base,
    wherein the first base is solid,
    wherein the first base is arranged on a second base, and
    wherein the second base is fluid-cooled.

2. The contact element of claim 1, wherein the front part comprises at least one pin having inner walls, and
    wherein the inner walls of the at least one pin are part of the inner walls of the front part.

3. The contact element of claim 1, wherein the front part of the contact element has a cross-section with a U-shape, and
    wherein the hollow chamber extends completely along the U-shape.

4. The contact element of claim 1, wherein the front part of the contact element has a cross-section with a U-shape, and
    wherein the hollow chamber extends along one arm of the U-shape and a further hollow chamber extends along a further arm of the U-shape.

5. The contact element of claim 1, wherein the front part of the contact element has a cross-section with a U-shape,
    wherein the U-shape has a rotational symmetry along a central axis thereof, and
    wherein the hollow chamber extends along the one arm defined by the rotational symmetry of the U-shape.

6. The contact element of claim 1, wherein the front part of the contact element comprises a clip spring.

7. The contact element of claim 1, wherein the capillary structure comprises a printed structure.

8. An electric vehicle (EV) connector, comprising:
a contact element configured to connect a charging wire to a connector interface on a vehicle side;
a front part defined on the contact element; and
at least one base defined on the contact element,
wherein the front part comprises walls having an inner side and an outer side that enclose a hollow chamber, the hollow chamber being configured to be partly fillable with a fluid during operation, and
wherein the inner side of the walls is configured to draw the fluid from the hollow chamber via capillary structures formed within the walls,
wherein the front part of the contact element has a first base,
wherein the first base is solid,
wherein the first base is arranged on a second base, and
wherein the second base is fluid-cooled.

9. The connector of claim 8, wherein the front part comprises at least one pin having inner walls, and
wherein the inner walls of the at least one pin are part of the inner walls of the front part.

10. The connector of claim 8, wherein the front part of the contact element has a cross-section with a U-shape, and
wherein the hollow chamber extends completely along the U-shape.

11. The connector of claim 8, wherein the front part of the contact element has a cross-section with a U-shape, and
wherein the hollow chamber extends along one arm of the U-shape and a further hollow chamber extends along a further arm of the U-shape.

12. The connector of claim 8, wherein the front part of the contact element has a cross-section with a U-shape,
wherein the U-shape has a rotational symmetry along a central axis thereof, and
wherein the hollow chamber extends along the one arm defined by the rotational symmetry of the U-shape.

13. The connector of claim 8, wherein the front part of the contact element comprises a clip spring.

14. The connector of claim 8, wherein the capillary structure comprises a printed structure.

\* \* \* \* \*